C. A. & G. R. PARKER.
Hand Snow-Plows.
No. 157,078. Patented Nov. 24, 1874.
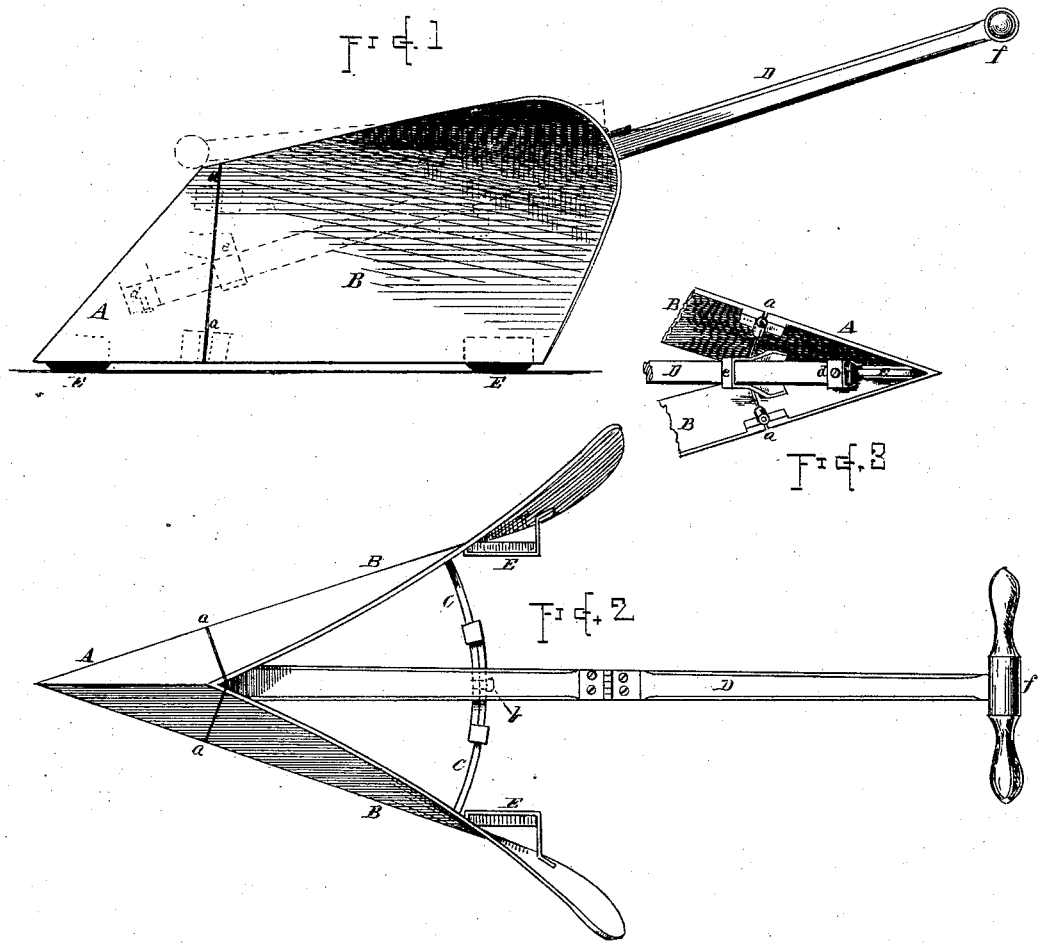

UNITED STATES PATENT OFFICE.

CHARLES A. PARKER AND GARDNER R. PARKER, OF WORCESTER, MASS.

IMPROVEMENT IN HAND SNOW-PLOWS.

Specification forming part of Letters Patent No. 157,078, dated November 24, 1874; application filed May 4, 1874.

*To all whom it may concern:*

Be it known that we, CHARLES A. PARKER and GARDNER R. PARKER, both of the city and county of Worcester and State of Massachusetts, have invented a certain new and useful Hand Snow-Plow; and we do hereby declare that the following is a full, clear, and exact description of the same, reference being had to the accompanying drawings, which form a part of this specification, and in which—

Figure 1 represents a side view of our improved hand snow-plow. Fig. 2 represents a plan view of the same; and Fig. 3 represents a bottom view of the point.

The object of our invention is to provide an implement for forming paths through new-fallen snow in a more convenient and expeditious manner than by the laborious operation of shoveling; and to that end our invention consists in an improved snow-plow adapted for operation by hand, and constructed with adjustable sides or wings, whereby the plow can be readily made to clear a broad or narrow path. The plow is also provided with three small shoes or bearers, for raising the sides and point from the surface of the ground, to prevent friction thereon, and permit the plow being propelled with ease, while the handle is made adjustable as to height, and jointed so as to fold forward upon the top of the plow to facilitate packing in small space.

In the drawings, A denotes the point, which is made from metal with side surfaces approaching each other at an acute angle, and forming, at their junction, a sharp backwardly-inclined arris or cutting-edge for dividing the snow at the front. B B indicate the side pieces or wings. These are made with their rear upper corners curved outward, and they are attached, at their front edges to the respective sides of the point, at *a a*, in such a manner that the surfaces of the point and wings will correspond in angle and direction, or so as to be practically continuous. The rear part of the wings B are provided with a supporting and adjusting device, whereby they can be spread or contracted to form a wide or narrow path, as desired.

In the present instance, perforated bars C C′ and a holding-bolt, *b*, are shown for this purpose, but any other suitable device may be employed therefor. D indicates the handle, by means of which the plow is propelled. Said handle is secured at its front end, *d*, in the point A, and is braced from lateral movement by a loop, *e*, so arranged that the cross-head *f* or rear end of the handle can be raised or lowered sufficiently to accommodate the height of the operator. Said handle is also jointed so that a portion of it can be folded forward upon the top of the plow, as indicated by dotted lines, Fig. 1, for convenience of packing.

Beneath the point A, and also at the rear lower part of the wings or sides B, we arrange small shoes or bearers, E E, combined with the plow in such a manner as to raise its lower edges a short distance from the surface of the ground, so that the entire weight of the implement will be borne on the smooth shoes E, which latter, being prepared to receive the friction, permit of the plow being propelled with ease. The shoes or bearers E are preferably made from rounded blocks of hard wood, but metal bearers or rolls may be used, if desired, and they may be attached to the plow by means of any suitable fastenings, adjustable or rigid, the bearers, of course, always standing parallel with the direction of motion of the plow.

The sides or wings B are, in the present instance, formed of curved sheet metal, but thin pieces of wood or other suitable material may be used when desired, and their size and curvature may be varied to suit the requirements of the work.

The point A may be formed from wood and covered with sheet metal, or be cast from malleable iron in lieu of the construction shown, and the attachment of the wings and point, at *a*, may be by hinges, springs, or otherwise.

From the foregoing description it will be seen that our improved hand snow-plow is light, cheap, and durable, and by its use much labor is obviated in the construction of pathways, thereby rendering it an implement of great practical value where the fall of snow is such as to make the digging of paths a frequent necessity.

The sides B, being adjustable, permit of the plow being used on wide or narrow paths, or with wide adjustment for light snow, and narrow adjustment when the snow is deep and heavy.

Having described our improved hand snow-plow, what we claim therein as new, and desire to secure by Letters Patent, is—

In a hand snow-plow, the combination, with the point A and rear part of the wings B B, of the shoes or bearers E, substantially as and for the purpose set forth.

CHARLES A. PARKER.
GARDNER R. PARKER.

Witnesses:
CHAS. H. BURLEIGH,
J. C. FRENCH.